(12) United States Patent
Kim

(10) Patent No.: US 8,375,479 B2
(45) Date of Patent: Feb. 19, 2013

(54) APPARATUS FOR RECYCLING WASTED HEAT USING WASTE HOT WATER

(75) Inventor: Yong Il Kim, Seoul (KR)

(73) Assignee: Gomyung-Enertech Co., Ltd., Seoul (KR)

( * ) Notice: Subject to any disclaimer, the term of this patent is extended or adjusted under 35 U.S.C. 154(b) by 485 days.

(21) Appl. No.: 12/582,109

(22) Filed: Oct. 20, 2009

(65) Prior Publication Data

US 2010/0270009 A1   Oct. 28, 2010

(30) Foreign Application Priority Data

Apr. 22, 2009   (KR) .................. 10-2009-0035157

(51) Int. Cl.
*A47K 3/022*   (2006.01)
(52) U.S. Cl. ..................................... 4/598; 4/508; 4/613
(58) Field of Classification Search .............. 4/613, 598, 4/508; 165/47, 909
See application file for complete search history.

(56) References Cited

U.S. PATENT DOCUMENTS

| | | | | |
|---|---|---|---|---|
| 4,291,423 | A | * | 9/1981 | Wilson .............................. 4/598 |
| 4,821,793 | A | * | 4/1989 | Sheffield ......................... 165/47 |
| 2007/0089230 | A1 | * | 4/2007 | Hendricks .......................... 4/596 |
| 2009/0230304 | A1 | * | 9/2009 | Hatano et al. ................. 250/311 |
| 2010/0180374 | A1 | * | 7/2010 | Davoudi .......................... 4/613 |

FOREIGN PATENT DOCUMENTS

| | | | |
|---|---|---|---|
| FR | 2917592 | A1 * | 12/2008 |
| JP | 1994058624 | A | 3/1994 |
| KR | 20-0153759 | Y1 | 5/1999 |

OTHER PUBLICATIONS

Translation of FR 2 917 592.*

* cited by examiner

*Primary Examiner* — Gregory Huson
*Assistant Examiner* — Lauren Heitzer

(57) ABSTRACT

The present invention relates to an apparatus for recycling wasted heat using waste hot water that includes: a tub that charges and discharges waste hot water; a heat exchange unit that transfers the heat of waste hot water to cold water supplied to a shower bat; and an upper cover that the open upper portion of the tub, and is friendly to the environment by reducing the amount of fuel consumed to supply hot water and it is possible to reduce the fuel cost by the reduced amount of fuel consumption.

5 Claims, 4 Drawing Sheets

APPARATUS FOR RECYCLING WASTED HEAT USING WASTE HOT WATER

BACKGROUND OF THE INVENTION

1. Field of the Invention

The present invention relates to an apparatus for recycling wasted heat using waste hot water. In detail, the present invention relates to an apparatus for recycling wasted heat using waste hot water, which collects waste hot water that is discharged after being used from a shower or bath and then preheats cold water to be supplied for a shower, using heat of the waste hot water.

2. Description of the Related Art

In general, hot water that is used in houses or bathhouses is supplied to waterworks or showers through hot water supply lines after water at the normal temperature is heated by a variety of boilers using fossil fuel or electric energy.

Most hot water used for a bath or a shower is discharged through a drain-outlet, but it is undesirable in terms of efficient use of energy to discharge the waste hot water outside a bathhouse without recycling the heat of the waste hot water, because the heat of the discharged waste hot water has temperature of 30° C. or more.

In consideration of the above problem, efforts for applying an apparatus for recycling various wasted heats, which collects the heat of waste hot water and reuses it to heat water, to hot water equipment, such as a large bathhouse, have been recently made to reduce use of fossil fuels and prevent air pollution.

However, apparatuses for recycling wasted heat in the related art had a problem in that thermal efficiency is easily deteriorated, because the structure is complicated and foreign substances are easily gathered on the internal heat transfer surface. Therefore, even though the heat transfer surface should be frequently cleaned, it was difficult to clean it, because the structure is a covered type.

Meanwhile, it was substantially difficult to install a large apparatus for recycling wasted heat of the related art in small bathrooms of houses in terms of the cost and structure and research for an apparatus for recycling wasted heat, which has a simple structure and can be achieved at a low cost such that it can be installed in houses, are still insufficient. Accordingly, most water for a shower and a bath used once in houses is now discharged.

SUMMARY OF THE INVENTION

In order to overcome the above problems, it is an object of the present invention to provide an apparatus for recycling wasted heat, using waste hot water, which saves energy and prevents deterioration of absorption efficiency of wasted heat due to easy maintenance by preheating cold water that is supplied to a shower, using the wasted heat of waste hot water.

In order to achieve the above objects, the present invention provides an apparatus for recycling wasted heat using waste hot water that includes: a tub (i.e., waste water tub) having a bottom with a floor drain through which water is discharged, a side that is connected to the bottom and protrudes upward from the bottom while forming an internal space, and a drain control unit that is formed around the floor drain and controls drain; a heat exchange unit that has heat collecting pipes (or heat transfer pipes) through which cold water to be supplied for a shower flows, is disposed in the tub, and transfers the heat of waste hot water filled in the tub to the cold water to be supplied for a shower flowing through the heat collecting pipes; and an upper cover that has drain holes and covers the open upper portion of the tub.

The drain control unit protrudes upward from the bottom and has lower drain grooves for discharging water, at the lower end.

Further, an upper drain groove for adjusting the level of the waste hot water filled in the internal space of the tub may be formed at the upper end of the drain control unit.

Further, the upper end of the drain control unit is in contact with the bottom of the upper cover.

Further, the heat exchange unit may be provided with a quick coupler at both ends.

Further, the bottom of the tub declines such that the water filled in the tub flows to the lower drain grooves.

Further, the heat exchange unit includes a spacer that makes a gap between the heat exchange unit and the bottom of the tub.

According to the present invention, it is friendly to the environment by reducing the amount of fuel consumed to supply hot water and it is possible to reduce the fuel cost by the reduced amount of fuel consumption. Further, since the structure is simple and the manufacturing cost is low, maintenance, such as cleaning or replacing, is easy.

DETAILED DESCRIPTION OF THE PREFERRED EMBODIMENTS

Figure 1:
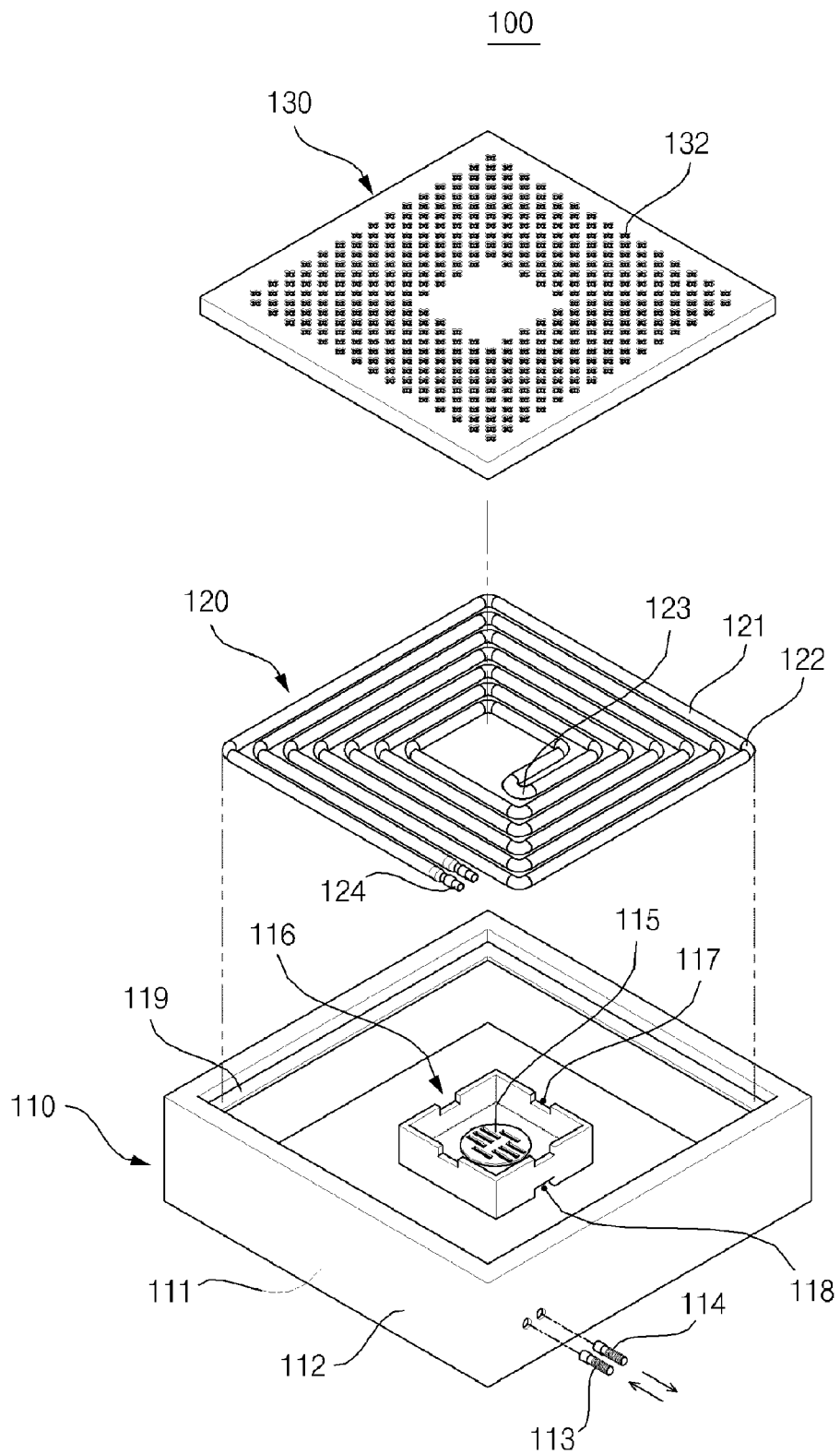
FIG. 1 is an exploded perspective view of an apparatus for recycling wasted heat using waste hot water according to an embodiment of the present invention.

Hereinafter, preferred embodiments of the present invention will be described in detail with reference to the accompanying drawings. First of all, it is to be noted that in giving reference numerals to elements of each drawing, like reference numerals refer to like elements even though like elements are shown in different drawings. Detailed descriptions may not be provided if it is determined those may make the aspect of the present invention unclear. Hereinafter, the preferred embodiment of the present invention will be described, but it will be understood to those skilled in the art that the spirit and scope of the present invention are not limited thereto and modifications and changes can be made in various ways.

Figure 2:
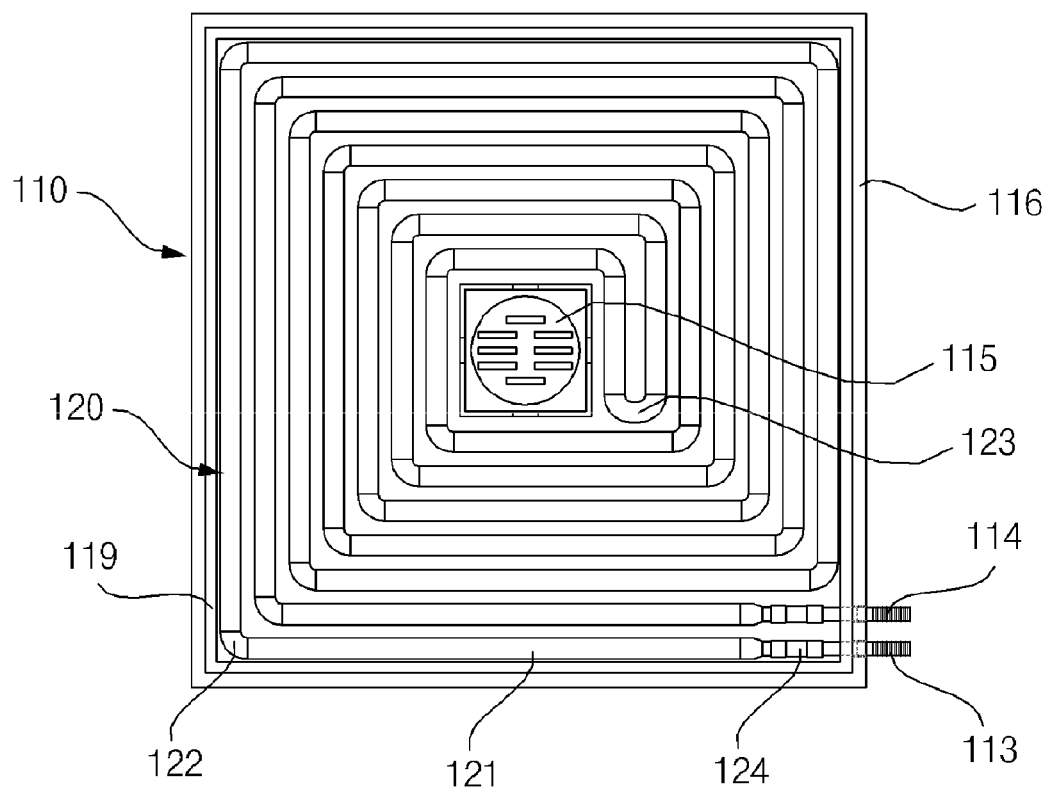
FIG. 2 is a plan view of the apparatus for recycling wasted heat using waste hot water, with the upper cover open.
Figure 3:
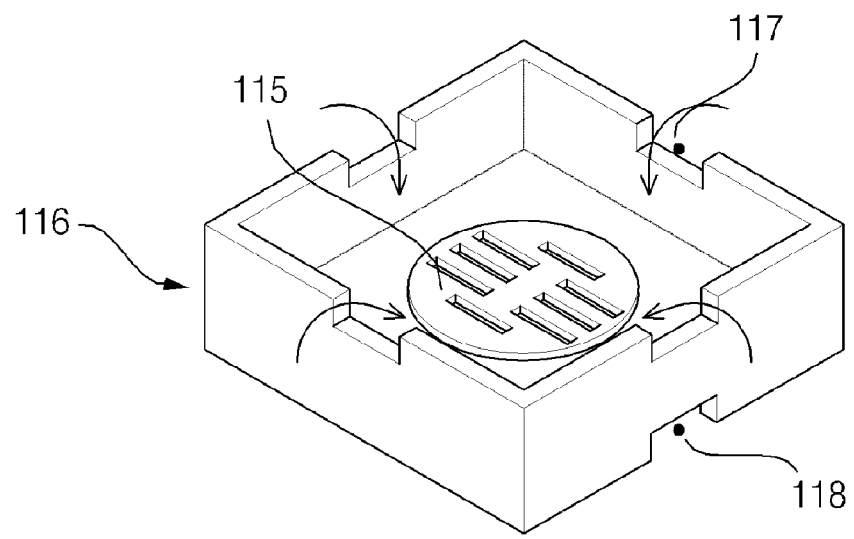
FIG. 3 is a perspective view of a drainage control unit.
Figure 4:
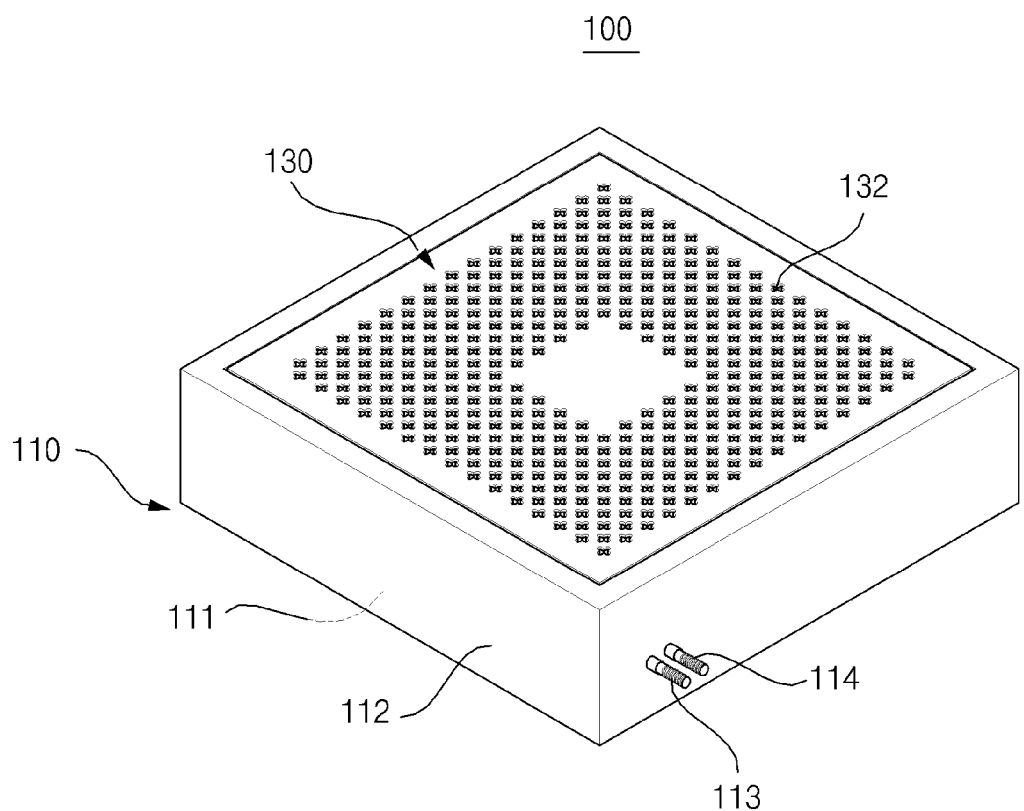
FIG. 4 is a perspective view of the apparatus for recycling wasted heat using waste hot water which has been assembled.
Figure 5:
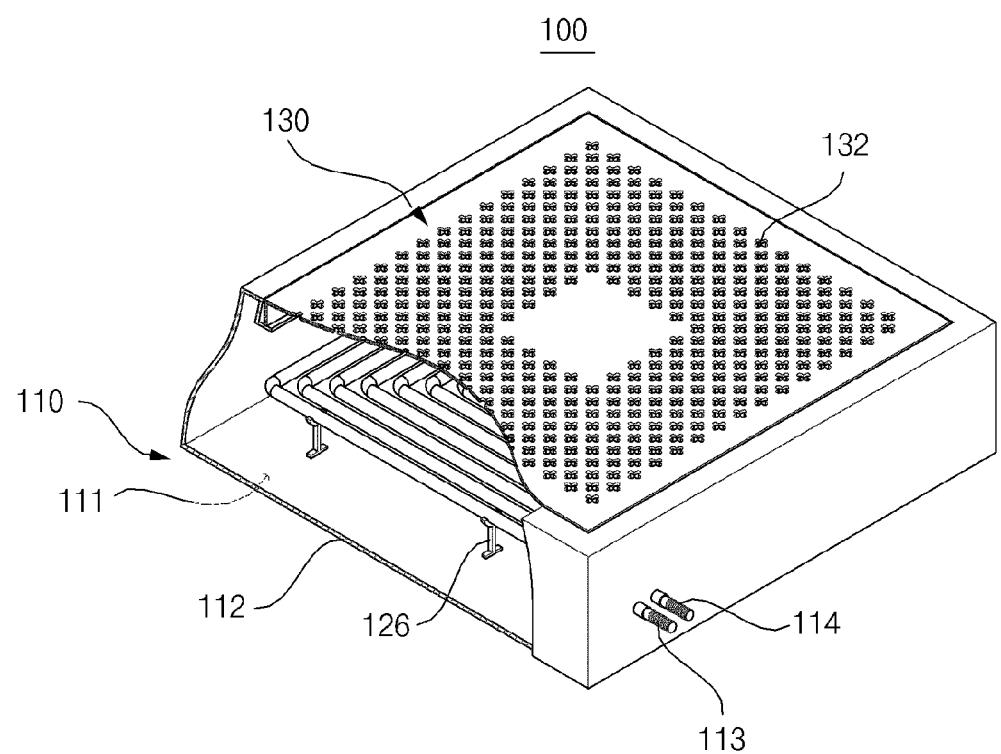
FIG. 5 is a perspective view of the apparatus with a cutout showing the spacer.

FIG. 1 is an exploded perspective view of an apparatus for recycling wasted heat using waste hot water according to an embodiment of the present invention, FIG. 2 is a plan view of the apparatus for recycling wasted heat using waste hot water, with the upper cover open, FIG. 3 is a perspective view of a drainage control unit, FIG. 4 is a perspective view of the apparatus for recycling wasted heat using waste hot water which has been assembled and FIG. 5 is a perspective view of the apparatus with a cutout showing the spacer.

Hereinafter, an apparatus 100 for recycling wasted heat using waste hot water (referred to as "apparatus for recycling wasted heat") according to a preferred embodiment of the present invention is described with reference to FIGS. 1 to 4.

The apparatus for recycling wasted heat 100 is installed on the floor of a bathhouse, a bathroom, and a shower booth etc. where waste hot water is discharged, and reduces waste of energy by reducing the amount of hot water that is supplied to a shower, by preheating cold water that is supplied to the shower, using the heat of waste hot water.

The apparatus for recycling wasted heat 100 according to a preferred embodiment of the present invention includes a tub 110, a heat exchange unit 120, and an upper cover 130.

The tub 110 has a bottom 111 with a floor drain 115 through which water is discharged and a side 112 that is connected to the edge of the bottom 111, protruding upward from the bottom 111, and where waste hot water used for a predetermined purpose and discharged.

Although the tub 110 is formed in a rectangular parallelepiped shape with the upper side open in FIG. 1, the shape of the tub 110 is not limited thereto and it may be formed in a polygonal column or cylinder shape.

An inlet pipe 113 and an outlet pipe 114 that are connected with the heat exchange unit 120 are inserted in the tub 110 through the side 112. It is preferable to seal the portions where the inlet pipe 113 and the outlet pipe 114 pass therethrough and prevent leakage of water filled in the tub 110 such that the floor where the apparatus for recycling wasted heat 100 is installed is prevented from contamination due to the waste hot water.

In this embodiment, the inlet pipe 113 is a cold water supply pipe that is connected to a water pipe and provided to a shower and the outlet pipe 114 is a cold water pipe that is provided for a showerhead that has undergone heat exchange with waste hot water. The inlet pipe 113 and the outlet pipe 114 can be made of a stainless material to prevent corrosion.

The height of the tub 110 is set larger than the diameter of a heat collecting pipe (or heat transfer pipe) 121 of the heat exchange unit 120 such that the heat exchange unit 120 including the heat collecting pipe 121 can be completely submerged in the waste hot water filled in the tub 110.

It is preferable that the tub 110 is made of a material having corrosion resistance, such as stainless steel, because it contacts with water, for the characteristic.

A cover support portion 119 that protrudes is formed at a predetermined distance from the upper end inside the side 112 of the tub 110. The cover support portion 119 supports the upper cover 130 covering the tub 110. In this embodiment, the distance between the cover support portion 119 and the upper end of the tub 110 is set such that a step is not formed when the upper portion of the tub 110 is covered by the upper cover 130, in consideration of the thickness of the upper cover 130.

Meanwhile, the tub 110 further has a drain control unit 116 that surrounds the floor drain 115, protruding upward from the bottom of the tub 110.

The upper end of the drain control unit 116 is in contact with the bottom of the upper cover 130 covering the open upper portion of the tub 110, such that the heat exchange unit 120 can be completely submerged in the waste hot water filled in the tub 110 by the drain control unit 116 and the heat of the waste hot water can be sufficiently transferred to the heat exchange unit 120. Further, the upper end of the drain control unit 116 supports the upper cover 130 while being in contact with the bottom of the cover 130, such that structural stability can be ensured.

Drain grooves 117 are formed at the upper end of the drain control unit 116. The waste hot water filled in the tub 110 is discharged through the upper drain grooves 117 of the drain control unit 116 and the floor drain 115 disposed in the drain control unit 116. It is preferable to adjust the size and the number of the upper drain grooves 117 formed at the upper end of the drain control unit 116 in accordance with the internal volume of the tub 110 such that the waste hot water filled in to tub 110 does not flow over the upper cover 130.

On the other hand, it is preferable that lower drain grooves 118 are further formed at the lower end of the drain control unit 116. The lower drain grooves 118 allows the waste hot water filled in the tub 110 to be completely discharged through the floor drain 115, without collecting in the tub 110.

It is preferable to determine the size or the number of the lower drain grooves 118 in consideration of the internal volume of the tub and the drain capacity of the upper drains 117, because it is difficult to sufficiently ensure the level of the waste hot water filled in the tub 110, when the size or the number of lower drain grooves 118 is excessively large.

The floor drain 115 provided on the bottom 111 of the tub 110 is connected with a drain pipe such that the waste hot water filled in the tub 110 is discharged to a drain-outlet through the floor drain 115 after exchanging heat in the tub 110.

Further, the bottom 111 declines such that the water filled in the tub 110 flows to the lower drain grooves 118, in order to easily discharges the water filled in the tub 110.

The heat collecting unit 120 is formed by connecting the heat collecting pipes 121, through which cold water supplied to a shower flows, using pipe connectors 122, 123, and is disposed in the tub 110. The shape of the heat exchange unit 120 can be changed in accordance with the arrangement of the drain control unit 116 corresponding to the position of the drain pipe, or other installation conditions of the apparatus 100 for recycling wasted heat. Meanwhile, as another embodiment, the heat exchange unit 120 can be formed by bending one long pipe.

The heat exchange unit 120 transfers the heat of the waste hot water filled in the tub 110 to the cold water that is supplied to a shower through the heat collecting pipes 121. It is preferable to use a copper pipe that has high heat conductivity and corrosion resistance for the heat collecting pipes 121.

The heat exchange unit 120 may be provided with a quick coupler 124 at both ends. The quick coupler 124, which is a pipe connecting member for easy connection of pipes, connects both ends of the heat exchange unit 120 with the inlet pipe 113 and the outlet pipe 114.

The heat exchange unit 120 can be easily disposed in the tub 110 by the quick coupler 124. In other words, it is possible to save installation time of the heat exchange unit 120 by performing assemblage of the heat exchange unit 120, which is formed by assembling a plurality of heat collecting pipes 121, outside the tub 110 and then disposing the heat exchange unit 120 in the tub 110, using the quick couplers 124. Further, it is easy to replace the heat exchange unit 120 later, because it is possible to making the heat exchange unit 120 in a single unit, using the quick couplers 124.

Meanwhile, the heat exchange unit 120 may be provided with a spacer 126 (see FIG. 5) which makes a gap between the heat exchange unit 120 and the bottom 111 of the tub 110. Since the heat exchange unit 120 is spaced apart from the bottom 111 of the tub 110 by the spacer 126, it is possible to further increase the contact area of the waste hot water and the heat exchange unit 120.

As the pipe connectors 122, 123 connecting the heat collecting pipes 121, various connecting members, such as the L-shaped pipe connector 122 and the U-shape pipe connector 123, can be used in accordance with the shape connected portions between the heat collecting pipes 121, and it is possible to adjust the pipe diameter using a reducer, when the heat collecting pipes 121, the inlet pipe 113, and the outlet pipe 114 are different in diameter.

The upper cover 130 is a plate-shaped member covering the upper portion of the tub 110, which has drain holes 132 formed in the up-down direction. It is preferable that the size of the drain holes 132 is not too large to prevent foreign substances from flowing into the tub 110.

Further, the drain holes 132 are not formed at the portion where the drain control unit 116 faces the upper cover 130 to prevent the waste hot water from being directly discharged through the floor drain 115 inside the drain control unit 116 without exchanging heat with the heat exchange unit 120.

According to the apparatus for recycling wasted heat 100 described above, it is possible to increase the temperature of the cold water by 10° C., which has average temperature of around 10° C. and is supplied to a shower, such that it is possible to reduce the amount of hot water that is supplied to the shower and correspondingly reduce the amount of fuel consumption.

It is possible to reuse waste hot water that will be discharged after flowing out of a shower by installing the apparatus for recycling wasted heat 100 on the bottom of a shower room or a shower booth. In addition, it is possible to preheat boiler supply water by collecting waste hot water, which is used once and then discharged, into the tub 110.

The spirit of the present invention has just been exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

What is claimed is:

1. An apparatus for recycling heat from waste water, the apparatus comprising:
   a tub having a bottom with a floor drain through which water is discharged, a side that is connected to the bottom and protrudes upward from the bottom to define a space, and a drain control unit that is formed around the floor drain and controls the water discharge of the floor drain;
   a heat exchange unit provided in the tub and having heat transfer pipes through which water to be supplied to a shower flows therein, the heat transfer pipes configured to transfer heat of waste water provided in the tub to the water to be supplied to the shower that flows through the heat transfer pipes; and
   an upper cover that covers an open upper portion of the tub and has drain holes to allow water flow therethrough,
   wherein the drain control unit has upper drain grooves configured to control a level of the waste water provided within the tub,
   wherein an upper portion of the drain control unit is in contact with a bottom of the upper cover, and
   wherein a height of a lowest part of the upper drain grooves is higher than the heat exchange unit.

2. The apparatus of claim 1, wherein the drain control unit has lower drain grooves at the bottom of the drain control unit and allows water to be discharged at a slow enough rate to allow the water to fill to the upper drain grooves when the waste water is flowing at a given flow rate.

3. The apparatus of claim 1, wherein the heat exchange unit has a quick coupler where the water enters and exits the heat exchange unit.

4. The apparatus of claim 1, wherein a bottom surface of the tub slopes downward towards the floor drain.

5. The apparatus of claim 1, wherein the heat exchange unit includes a spacer between the heat exchange unit and the bottom of the tub.

* * * * *